United States Patent [19]

Adachi

[11] Patent Number: 4,814,874
[45] Date of Patent: Mar. 21, 1989

[54] INTERMEDIATE-FREQUENCY PROCESSING CIRCUIT

[75] Inventor: Takesi Adachi, Kumagaya, Japan

[73] Assignee: Kabushiki Kaisha Toshiba, Kawasaki, Japan

[21] Appl. No.: 173,119

[22] Filed: Mar. 25, 1988

[30] Foreign Application Priority Data

Mar. 31, 1987 [JP] Japan ................... 62-78625

[51] Int. Cl.$^4$ .................. H04N 7/01; H04N 7/04
[52] U.S. Cl. .................... 358/140; 358/143
[58] Field of Search ............. 358/140, 143; 455/142, 455/143

[56] References Cited

U.S. PATENT DOCUMENTS 4,156,253 5/1979 Steudel ........................ 358/11
4,611,227 9/1986 Brockhurst et al. ............ 358/142 X

FOREIGN PATENT DOCUMENTS 3225385 1/1984 Fed. Rep. of Germany ...... 358/140
3248002 7/1984 Fed. Rep. of Germany ...... 358/140

Primary Examiner—James J. Groody
Assistant Examiner—E. Anne Faris
Attorney, Agent, or Firm—Cushman, Darby & Cushman

[57] ABSTRACT

A first surface acoustic wave (SAW) filter has flat characteristics with a pass band which corresponds to a frequency ranging from a picture intermediate frequency to a sound intermediate frequency of the B/G system. A second SAW filter has double-humped characteristics which have pass bands near a sound intermediate frequency in the VHF high-band and UHF band of the L system, and near a sound intermediate frequency in the VHF low-band of the L system. When a tuned frequency of a video tank circuit is switched to a frequency ranging between the picture intermediate frequency of the B/G system and the picture intermediate frequency in the VHF low-band of the L system, a video IC obtains either picture and sound demodulation outputs of the B/G system or a picture demodulation output of the L system from the output of the first SAW filter. When a tuned frequency of a sound tank circuit is switched to a frequency ranging between the sound intermediate frequency in the VHF high-band and UHF band of the L system and the sound intermediate frequency in the VHF low-band of the L system, a sound IC obtains a sound demodulation output of the L system from the second SAW filter.

17 Claims, 5 Drawing Sheets

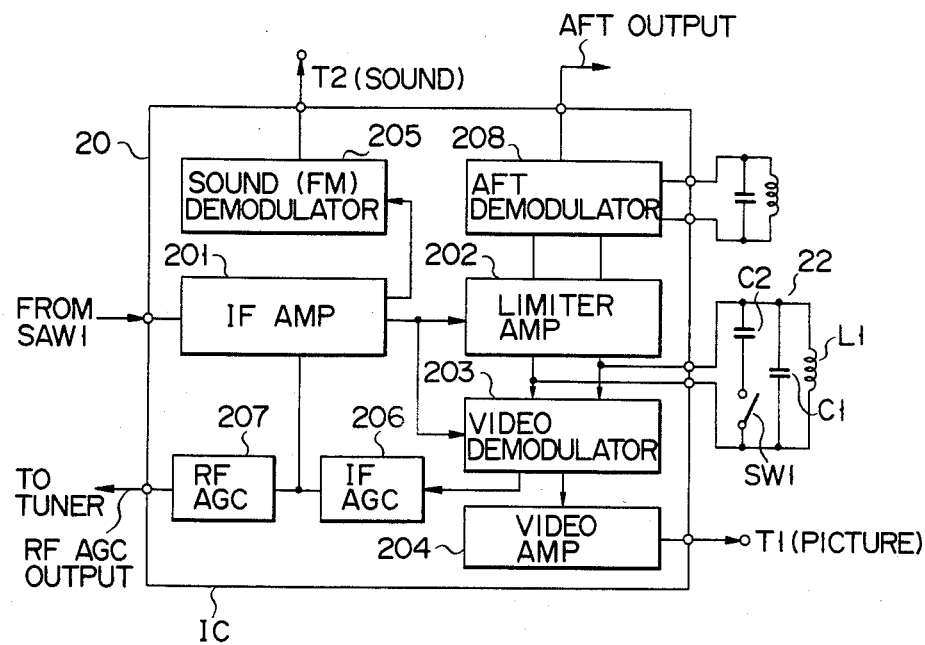
F I G. 5
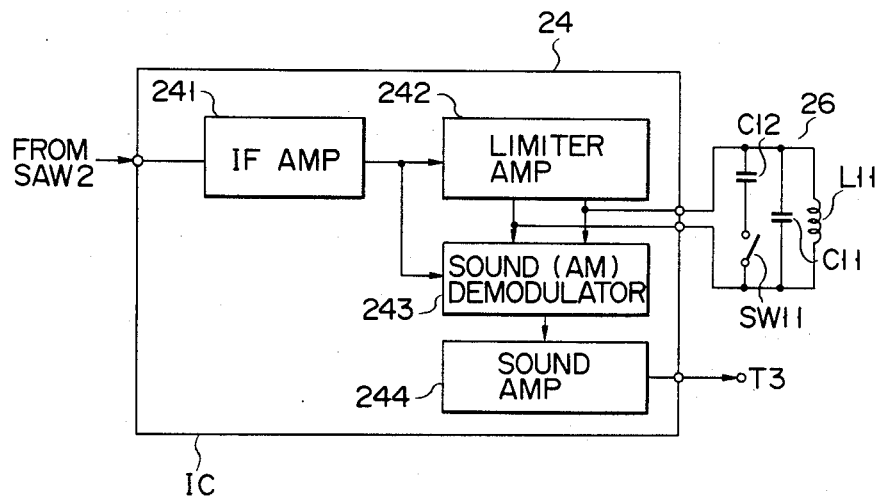
F I G. 6

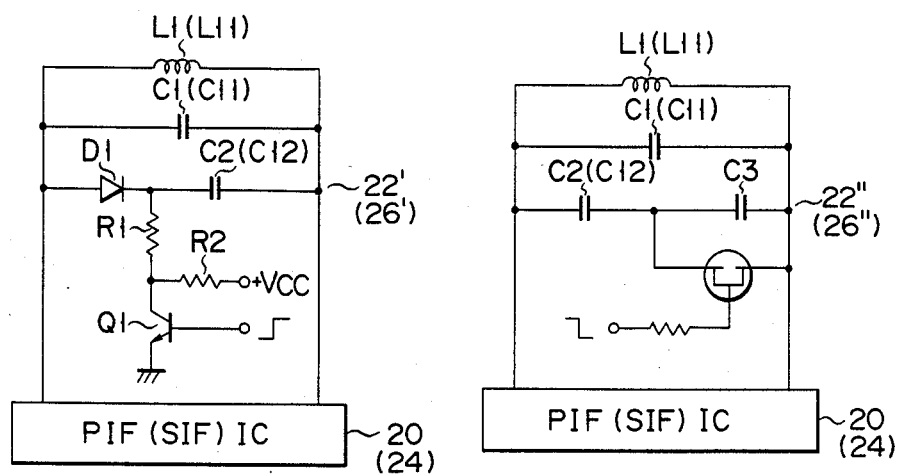
F I G. 7A   F I G. 7B
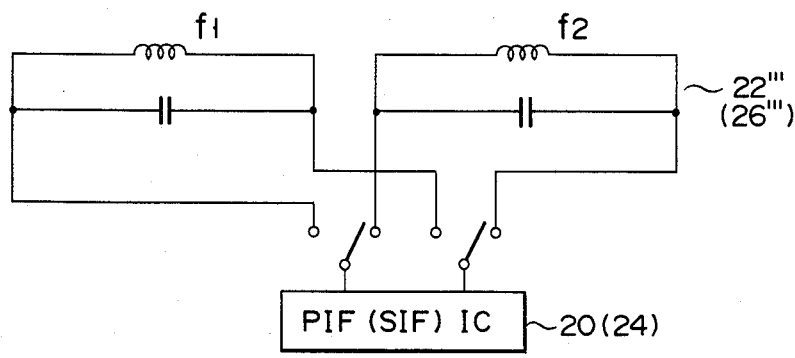
F I G. 7C

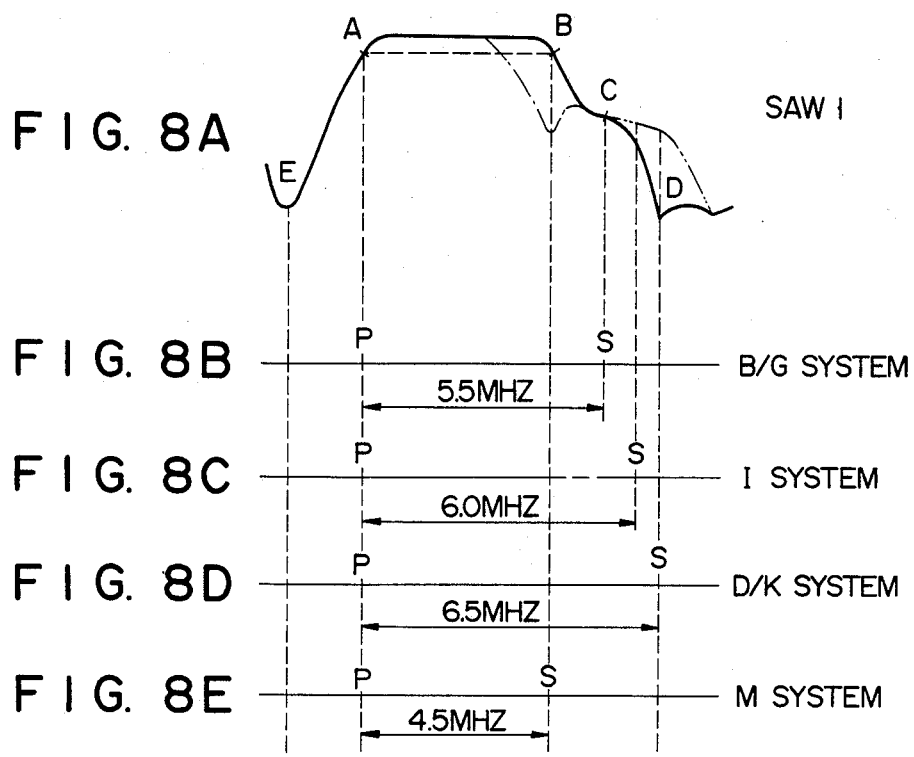

INTERMEDIATE-FREQUENCY PROCESSING CIRCUIT

BACKGROUND OF THE INVENTION

1. Field of the Invention

The present invention relates to an intermediate-frequency processing circuit suitable for processing an intermediate frequency in different television transmission systems such as the L system and the B/G system.

2. Description of the Related Art

In recent years, a variety of multitelevision receivers which can receive a plurality of television broadcast systems of different television signal transmission systems have been developed. There are a variety of television systems. For example, the L system is employed in France, and the B/G system is employed in West Germany, East Germany, Spain, and Italy. FIGS. 1A to 1C show relationships among picture intermediate frequency P, sound intermediate frequency S, and local frequency Lf in the VHF low-band, VHF high-band, and whole UHF band in the L system. FIGS. 2A to 2C show relationships among picture intermediate frequency P, sound itermediate frequency S, and local frequency Lf in the VHF low-band, VHF high-band, and whole UHF band in the B/G system. As can be seen from these figures, the difference between these television signal transmission systems is that the positional relationship between picture and sound intermediate frequencies P and S in the VHF low-band of the L system is reversed to that in the other cases. An FM-modulated sound signal is received in the B/G system, while an AM-modulated sound signal is received in the L system. A difference between the sound and video intermediate frequencies is 5.5 MHz in the B/G system, and is 6.5 MHz in the L system.

Conventionally, an intermediate-frequency (IF) processing circuit in a multitelevision receiver which can receive television signals of both the L and B/G systems comprises three surface acoustic wave (SAW) filters, and three IF processing integrated circuits (ICs). More specifically, the first SAW filter has pass-band characteristics such that, of signals output from a tuner, an IF signal of the B/G system and IF signals in the VHF high-band and UHF band of the L system are supplied to the first IF processing IC. The second SAW filter has pass-band characteristics such that, of signals output from the tuner, picture intermediate frequency P in the VHF low-band of the L system is supplied to the second IF processing IC. The third SAW filter has pass-band characteristics such that, of signals output from the tuner, sound intermediate frequency S in the VHF low-band of the L system is supplied to the third IF processing IC. The first IF processing IC is a video IC for demodulating picture and sound signals in the VHF high-band and UHF band of the L system. The second IF processing IC is a video IC for demodulating a picture signal in the VHF low-band of the L system. The third IF processing IC is a sound IC for demodulating a sound signal in the VHF low-band of the L system. In this manner, the conventional IF processing circuit has two video ICs and three (SAW) filters.

However, the video IC is constituted by an IF amplifier, a limiter amplifier, a video demodulator, a video amplifier, a sound demodulator, an IF automatic gain controller, an RF automatic gain controller, and an automatic fine tuning demodulator, and the like. Therefore, the circuit configuration is complicated and large. Thus, the number of components is increased, resulting in an increase in cost of the apparatus, degradation of reliability, poor maintenance properties, difficulty in design, and the like. Since the two video ICs are arranged, the DC levels of demodulation outputs of the two video ICs cannot be easily kept constant, and a DC reproducing circuit for adjusting the DC levels is required. In addition, since the two video ICs are arranged, operating points of the IF automatic gain controllers and the RF automatic gain controllers, and the output levels of the automatic fine tuning demodulators are shifted from each other.

SUMMARY OF THE INVENTION

It is an object of the present invention to provide an intermediate-frequency processing circuit which can reduce a circuit size, omit a DC reproducing circuit, and eliminate differences in demodulation output levels, and the like.

The intermediate-frequency processing circuit according to the present invention comprises first filter means for receiving first to third intermediate-frequency signals, the first intermediate-frequency signal having picture and sound intermediate frequency components at a first frequency interval, the second intermediate-frequency signal having picture and sound intermediate frequency components at a second frequency interval, the frequency of the picture intermediate frequency component of the second intermediate-frequency signal being substantially equal to the frequency of the picture intermediate frequency component of the first intermediate-frequency signal, the frequency of the sound intermediate frequency component of the first intermediate-frequency signal being present between the frequencies of the picture and sound intermediate frequency components of the second intermediate-frequency signal, the third intermediate-frequency signal having picture and sound intermediate frequency components at a frequency interval substantially equal to the second frequency interval, the frequency of the picture intermediate frequency component of the third intermediate-frequency signal being present between the frequencies of the picture and sound intermediate frequency components of the first intermediate-frequency signal, and the frequencies of the picture intermediate frequency components of the first and second intermediate-frequency signals being present between the frequencies of the sound and picture intermediate frequency components of the third intermediate-frequency signal, the first filter means having flat characteristics which have a pass band corresponding to a frequency range from the frequency of the picture intermediate frequency component to the frequency of the sound intermediate frequency component of the first intermediate-frequency signal, second filter means, having double-humped characteristics which have pass bands near the frequencies of the sound intermediate frequency components of the sound and third intermediate-frequency signals, respectively, for receiving the first to third intermediate-frequency signals, first intermediate-frequency processing circuit means for demodulating the output from the first filter means to obtain any of picture and sound demodulation outputs of the first intermediate-frequency signal, the picture demodulation output of the second intermediate-frequency signal, and the picture demodulation output of the third intermediate-frequency signal, and second intermediate-frequency processing circuit means for demodulating the output from the second filter means to obtain either the sound demodulation output of the second intermediate-frequency signal or the sound demodulation output of the third intermediate-frequency signal.

BRIEF DESCRIPTION OF THE DRAWINGS

FIG. 5 is a block diagram showing an arrangement of a PIF IC shown in FIG. 3;

FIG. 6 is a block diagram showing an arrangement of a SIF IC shown in FIG. 3;

FIGS. 7A to 7C are views which explain an arrangement of a video tank circuit in the second to fourth embodiments; and FIGS. 8A to 8E are views which explain the characteristics of surface acoustic filters in a fifth embodiment.

DETAILED DESCRIPTION OF THE PREFERRED EMBODIMENTS

An embodiment of the present invention will be described with reference to the accompanying drawings. In the following description, a case will be described wherein the present invention is applied to a system which processes intermediate-frequency signals of the B/G and L systems.

Figures 1A, 1B, 1C:
FIGS. 1A to 1C are views showing relationships among picture intermediate frequency P, sound intermediate frequency S, and local frequency Lf in the VHF low-band, VHF high-band, and UHF band of the L system.
Figures 2A, 2B, 2C:
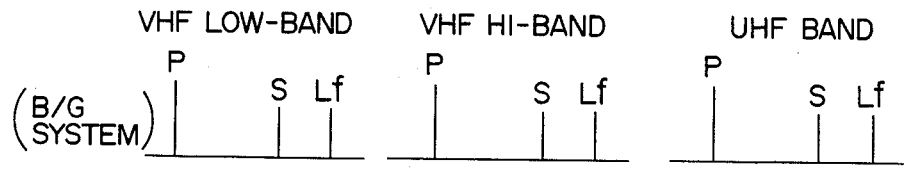
FIGS. 2A to 2C are views showing relationships among picture intermediate frequency P, sound intermediate frequency S, and local frequency Lf in the VHF low-band, VHF high-band, and UHF band of the B/G system.
Figure 3:
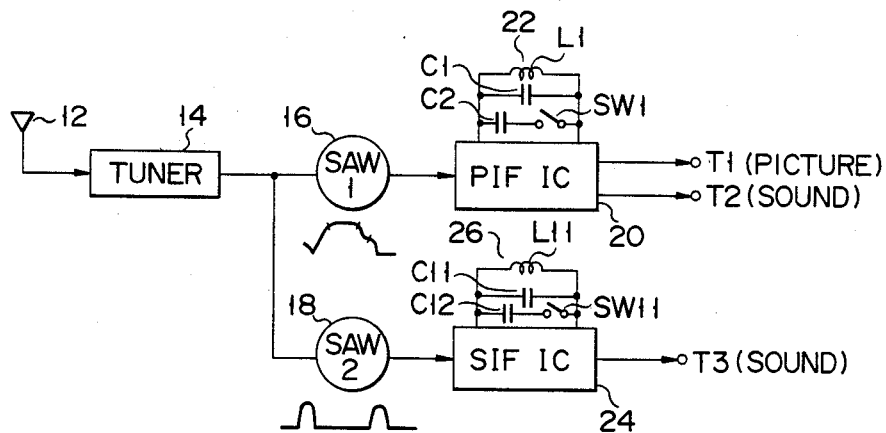
FIG. 3 is a block diagram showing an arrangement of an intermediate-frequency processing circuit according to an embodiment of the present invention.

FIG. 3 is a block diagram showing the arrangement of an embodiment of the present invention. In FIG. 3, a television signal received by antenna 12 is converted to an intermediate-frequency (IF) signal by tuner 14. The IF signal is supplied to surface acoustic wave (SAW) filters 16 and 18.

Figure 4:
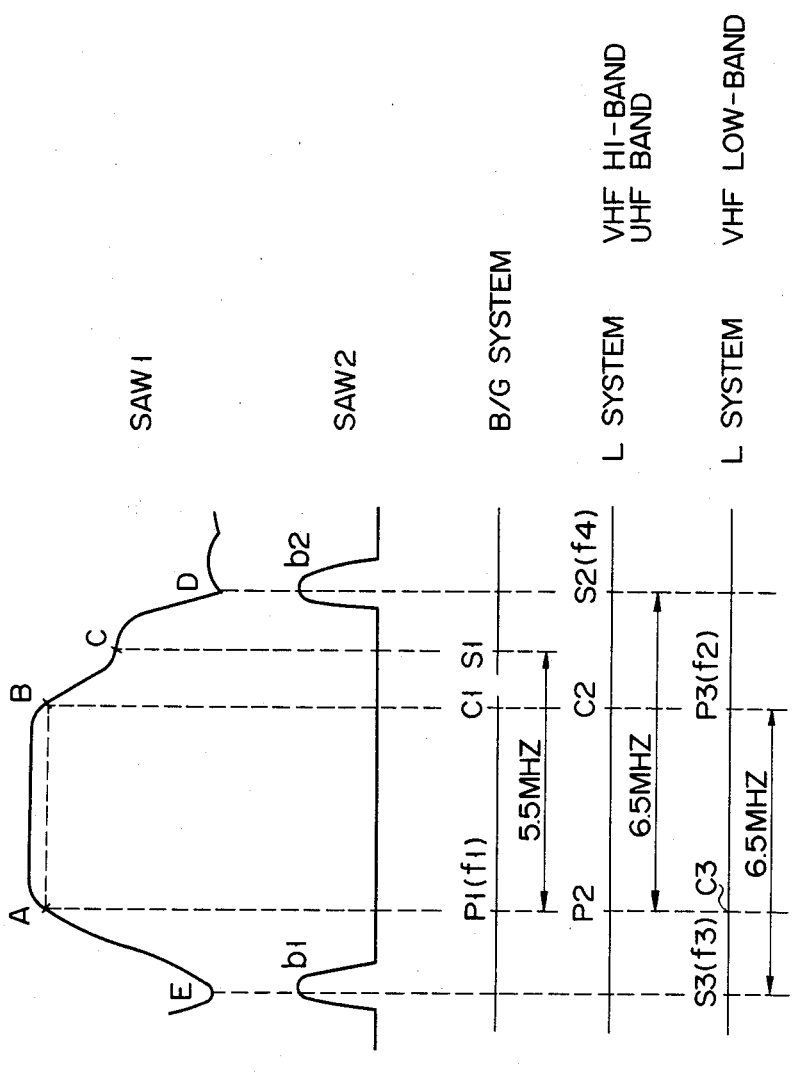
FIGS. 4A to 4E are views which explain the characteristics of surface acoustic wave filters.

SAW filter 16 has flat characteristics. More specifically, filter 16 has pass-band characteristics which correspond to a frequency ranging from picture intermediate frequency P1 (FIG. 4C) to sound intermediate frequency S1 (FIG. 4C), as is shown in FIG. 4A. SAW filter 18 has double-humped characteristics. That is, filter 18 has pass bands near sound intermediate frequency S2 (FIG. 4D) of the VHF high-band and the UHF band of the L system, and near sound intermediate frequency S3 (FIG. 4E) of the VHF low-band of the L system.

Picture intermediate frequency P2 (FIG. 4D) of the VHF high-band and the UHF band of the L system is equal to picture intermediate frequency P1 (FIG. 4C) of the B/G system, and sound intermediate frequency S2 is higher than sound intermediate frequency S1. Picture intermediate frequency P3 (FIG. 4E) is present between picture intermediate frequency P1 and sound intermediate frequency S1, and sound intermediate frequency S3 (FIG. 4E) is of a lower frequency than picture intermediate frequency P1. Therefore, the pass band of SAW filter 18 falls outside a cut-off point of SAW filter 16. Note that reference symbols C1, C2, and C3 in FIGS. 4C to 4E denote chroma signals.

The filtered output from SAW filter 16 is supplied to PIF IC (i.e., IC for picture IF) 20. As is shown in FIG. 5, PIF IC 20 normally includes IF AMP (amplifier) 201, limiter AMP (amplifier) 202, video demodulator 203, video AMP (amplifier) 204, sound (FM) demodulator 205, IF AGC (automatic gain controller) 206, RF AGC (automatic gain controller) 207, AFT (automatic fine tuning) demodulator 208, and the like.

PIF IC 20 is connected to video tank circuit 22 which includes a parallel circuit of coil L1 and capacitor C1. The parallel circuit of coil L1 and capacitor C1 in circuit 22 is selectively connected in parallel with capacitor C2 in accordance with the ON/OFF operation of switch SW1. More specifically, video tank circuit 22 can switch tuned frequency f0 based upon the ON/OFF setting of switch SW1. For example, when switch SW1 is ON, tuned frequency f0 is given as:

$$f0 = f1 = 1/\{2\pi \sqrt{L1(C1 + C2)}\}$$

where
- L1: inductance of coil L1
- C1: capacitance of capacitor C1
- C2: capacitance of capacitor C2

Frequency f1 coincides with picture intermediate frequencies P1 and P2 (FIGS. 4C and 4D). When switch SW1 is OFF, tuned frequency f0 is given as:

$$f0 = f2 = 1/(2\pi \sqrt{L1C1})$$

Frequency f2 coincides with picture intermediate frequency p3 (FIG. 4E).

The filtered output from SAW filter 18 is supplied to SIF IC (i.e., IC for sound IF) 24. As is shown in FIG. 6, SIF IC 24 includes IF AMP 241, limiter AMP 242, sound (AM) demodulator 243, sound AMP 244, and the like.

SIF IC 24 is connected to sound tank circuit 26 which includes a parallel circuit of coil L11 and capacitor C11. The parallel circuit of coil L11 and capacitor C11 of tank circuit 26 is selectively connected in parallel with capacitor C12, based upon the ON/OFF setting of switch SW11. Tank circuit 26 can switch tuned frequency f0, based upon the ON/OFF setting of switch SW11. For example, when switch SW11 is ON, tuned frequency f0 is given as:

$$f0 = f3 = 1/\{2\pi \sqrt{L11(C11 + C12)}\}$$

where
- L11: inductance of coil L11
- C11: capacitance of capacitor C11
- C12: capacitance of capacitor C12

Frequency f3 coincides with sound intermediate frequency S3 (FIG. 4E). When switch SW11 is OFF, tuned frequency f0 is given as:

$$f0 = f4 = 1/(2\pi \sqrt{L11C11})$$

Frequency f4 coincides with sound intermediate frequency S2 (FIG. 4D).

The operation of the IF processing circuit having the above arrangement will be described below.

(1) Reception Mode of the B/G System

In this mode, switch SW1 is turned on. Tuned frequency f0 of tank circuit 22 is set to be f1. Therefore, the demodulation output of picture intermediate frequency P1 appears at output terminal T1 of PIF IC 20. The demodulation output of sound intermediate frequency S1 appears at output terminal T2 of PIF IC 20. In this case, since SIF IC 24 receives no input due to the characteristics of SAW filter 18, a demodulation output does not appear at output terminal T3 of SIF IC 24.

(2) Reception Mode of VHF High-Band and UHF Band of the L System

In this mode, switch SW1 is turned on, and switch SW11 is turned off. Thus, tuned frequency f0 of tank circuit 22 is set to be f1, and tuned frequency f0 of tank circuit 26 is set to be f4. Therefore, the demodulation output of picture intermediate frequency P2 appears at output terminal T1 of PIF IC 20. The demodulation output of sound intermediate frequency S2 appears at output terminal T3 of SIF IC 24. In this case, a demodulation output does not appear at output terminal T2 of PIF IC 20 due to the characteristics of SAW filter 16, and because the sound signal of the L system is an AM signal.

(3) Reception Mode of VHF Low-Band of the L System

In this case, switch SW1 is turned off, and switch SW11 is turned on. Thus, tuned frequency f0 of tank circuit 22 is set to be f2, and tuned frequency f0 of tank circuit 26 is set to be f3. Therefore, the demodulation output of picture intermediate frequency P3 appears at output terminal T1 of PIF IC 20. The demodulation output of sound intermediate frequency S3 appears at output terminal T3 of SIF IC 24. In this case, a demodulation output does not appear at output terminal T2 of PIF IC 20.

According to the embodiment described above, in order to process a picture IF signal, a single PIF IC 20 need only be arranged. Therefore, the circuit size of the IF processing circuit can be reduced, a DC reproducing circuit can be omitted, and a difference in the demodulation output levels can be eliminated. In addition, only two SAW filters need be arranged.

The embodiment of the present invention has been described. However, the present invention is not limted to the above embodiment, and various changes and modifications may be made within the spirit and scope of the invention. For example, tank circuits 22 and 26 may have any arrangement as indicated by reference numerals 22', 26', 22", 26", and 22''', and 26''' in FIGS. 7A to 7C, as long as they are capable of switching a tuned frequency. For example, as is shown in video tank circuit 22' of FIG. 7A, a parallel circuit of coil L1 and capacitor C1 is connected in parallel with a series circuit of diode D1 and capacitor C2. The node between diode D1 and capacitor C2 is connected to operating power supply Vcc via resistors R1 and R2. The node between resistors R1 and R2 is connected to the collector of NPN transistor Q1, the emitter of which is grounded. In this video tank circuit 22', a drive signal can be supplied to the base of transistor Q1 so as to switch a tuned frequency. More specifically, when transistor Q1 is turned on, diode D1 is turned on, and capacitor C2 is connected in parallel with capacitor C1. Thus, the tuned frequency changes depending on the connection/disconnection of capacitor C2. Sound tank circuit 26' can be similarly arranged.

In video tank circuit 22" shown in FIG. 7B, a parallel circuit of coil L1 and capacitor C1 is connected in parallel with a series circuit of capacitors C2 and C3. Capacitor C3 is connected in parallel with the source and drain of an FET. In this video tank circuit 22", when the FET is turned on, capacitor C3 is short-circuited; when it is turned off, the series circuit of capacitors C2 and C3 is connected to the parallel circuit of coil L1 and capacitor C1. More specifically, the short-circuiting of capacitor C3 allows a tuned frequency to change. Sound tank circuit 26" can be similarly arranged.

In video tank circuit 22''' shown in FIG. 7C, a circuit having first tuned frequency f1 and a circuit having second tuned frequency f2 are selectively connected to PIF IC 20 via a switch. More specifically, one of these circuits is selectively connected, thereby switching a tuned frequency. Sound tank circuit 26''' can be similarly arranged.

When the pass-band characteristics of SAW filter 16 are changed, the present invention can be applied to other television broadcast systems. For example, if the characteristics are changed to wide band pass characteristics as indicated by a curve with an alternating long and two short dashes in FIG. 8A, television broadcast signals of the B/G system (FIG. 8B), the I system (FIG. 8C), and the D/K system (FIG. 8D) can be processed. If a trap is added to the characteristics, as indicated by an alternating long and short dashed curve in FIG. 8A, the television broadcast signal of the M system (FIG. 8E) can be received. Note that in any of the B/G, I, D/K, and M systems, an FM-modulated sound signal is received.

What is claimed is:

1. An intermediate-frequency processing circuit for processing a plurality of types of intermediate-frequency signals, comprising:

first filter means for receiving first to third intermediate-frequency signals, the first intermediate-frequency signal having picture and sound intermediate frequency components at a first frequency interval, the second intermediate-frequency signal having picture and sound intermediate frequency components at a second frequency interval, the frequency of the picture intermediate frequency component of the second intermediate-frequency signal being substantially equal to the frequency of the picture intermediate frequency component of the first intermediate-frequency signal, the frequency of the sound intermediate frequency component of the first intermediate-frequency signal being present between the frequencies of the picture and sound intermediate frequency components of the second intermediate-frequency signal, the third intermediate-frequency signal having picture and sound intermediate frequency components at a frequency interval substantially equal to the second frequency interval, the frequency of the picture intermediate frequency component of the third intermediate-frequency signal being present between the frequencies of the picture and sound intermediate frequency components of the first intermediate-frequency signal, and the frequencies of the picture intermediate frequency components of the first and second intermediate-frequency signals being present between the frequencies of the sound and picture intermediate frequency components of the third intermediate-frequency signal, said first filter means having flat characteristics with a pass band which corresponds to a frequency ranging from the frequency of the picture intermediate frequency component to the frequency of the sound intermediate frequency component of the first intermediate-frequency signal;

second filter means, having double-humped characteristics which have pass bands near the frequencies of the sound intermediate frequency components of the second and third intermediate-frequency signals, respectively, for receiving the first to third intermediate-frequency signals;

first intermediate-frequency processing circuit means for demodulating the output from said first filter means to obtain any of the picture and sound demodulation outputs of the first intermediate-frequency signal, the picture demodulation output of the second intermediate-frequency signal, and the picture demodulation output of the third intermediate-frequency signal; and second intermediate-frequency processing circuit means for demodulating the output from said second filter means to obtain either the sound demodulation output of the second intermediate-frequency signal or the sound demodulation output of the third intermediate-frequency signal.

2. The processing circuit according to claim 1, wherein said first intermediate-frequency processing circuit means has a video tank circuit which can switch a tuned frequency between the frequency of the picture intermediate frequency component of the first intermediate-frequency signal and the frequency of the picture intermediate frequency component of the third intermediate-frequency signal; when the tuned frequency of said video tank circuit is switched to the frequency of the picture intermediate frequency component of the first intermediate-frequency signal, said first intermediate-frequency processing circuit means obtains the picture and sound demodulation outputs of the first intermediate-frequency signal if said first filter means receives the first intermediate-frequency signal, and obtains the picture demodulation output of the second intermediate-frequency signal if said first filter means receives the second intermediate-frequency signal; and when the tuned frequency of said video tank circuit is switched to the frequency of the picture intermediate frequency component of the third intermediate-frequency signal, said first intermediate-frequency processing circuit means obtains the picture demodulation output of the third intermediate-frequency signal.

3. The processing circuit according to claim 2, wherein said video tank circuit is constituted by parallel-connecting a coil, a first capacitor, and a series circuit of a second capacitor, and a switch.

4. The processing circuit according to claim 3, wherein, when said switch is turned on, said video tank circuit sets the tuned frequency to be the frequency of the picture intermediate frequency component of the first intermediate-frequency signal, and when said switch is turned off, it sets the tuned frequency to be the frequency of the picture intermediate frequency component of the third intermediate-frequency signal.

5. The processing circuit according to claim 1, wherein said second intermediate-frequency processing circuit means has a sound tank circuit which can switch a tuned frequency between the frequency of the sound intermediate frequency component of the second intermediate-frequency signal the and the frequency of the sound intermediate frequency component of the third intermediate-frequency signal; and when the tuned frequency of said sound tank circuit is switched to the frequency of the sound intermediate frequency component of the second intermediate-frequency signal, said second intermediate-frequency processing circuit means obtains the sound demodulation output of the second intermediate-frequency signal; and when the tuned frequency of said sound tank circuit is switched to the frequency of the sound intermediate frequency component of the third intermediate-frequency signal, said second intermediate-frequency processing circuit means obtains the sound demodulation output of the third intermediate-frequency signal.

6. The processing circuit according to claim 5, wherein said sound tank circuit is constituted by parallel-connecting a coil, a first capacitor, and a series circuit of a second capacitor, and a switch.

7. The processing circuit according to claim 6, wherein, when said switch is turned on, said sound tank circuit sets the tuned frequency to be the frequency of the sound intermediate frequency component of the second intermediate-frequency signal, and when said switch is turned off, it sets the tuned frequency to be the frequency of the sound intermediate frequency component of the third intermediate-frequency signal.

8. The processing circuit according to claim 1, wherein the first intermediate-frequency signal is an intermediate-frequency signal of a B/G system, the second intermediate-frequency signal is an intermediate-frequency signal in a VHF high-band and a UHF band of an L system, and the third intermediate-frequency signal is an intermediate-frequency signal in a VHF low-band of the L system.

9. The processing circuit according to claim 1, wherein each of said first and second filter means comprises a surface acoustic wave filter.

10. An intermediate-frequency processing circuit in a multisystem television receiver which can receive television signals of L and B/G systems, comprising:

first filter means for receiving intermediate-frequency signals of the B/G and L systems, said first filter means having flat characteristics with a pass band which corresponds to a frequency ranging from the frequency of a picture intermediate frequency component to the frequency of a sound intermediate frequency component of the B/G system;

second filter means for receiving the intermediate-frequency signals of the B/G and L systems, said second filter means having double-humped characteristics which have pass bands near the frequency of a sound intermediate frequency component in a VHF high-band and a UHF band of the L system and near the frequency of a sound intermediate frequency component in a VHF low-band of the L system, first intermediate-frequency processing circuit means for demodulating the output from said first filter means to obtain any of the picture and sound demodulation outputs of the B/G system, the picture demodulation output in the VHF high-band of the L system, the picture demodulation output in the UHF band of the L system, and the picture demodulation output in the VHF low-band of the L system; and second intermediate-frequency processing circuit means for demodulating the output from said second filter means to obtain any of the sound demodulation output in the VHF high-band of the L system, the sound demodulation output of the UHF band of the L system, and the sound demodulation output in the VHF low-band of the L system.

11. The processing circuit according to claim 10, wherein said first intermediate-frequency processing circuit means has a video tank circuit which can switch a tuned frequency to a frequency ranging between the frequency of the picture intermediate frequency component of the B/G system and the frequency of the picture intermediate frequency component in the VHF low-band of the L system; when the tuned frequency of said video tank circuit is switched to the frequency of the picture intermediate frequency component of the B/G system, said first intermediate-frequency processing circuit means obtains the picture and sound demodulation outputs of the B/G system if said first filter means receives the intermediate-frequency signals of the B/G system, obtains the picture demodulation output in the VHF high-band of the L system if said first filter means receives the intermediate-frequency signal in the VHF high-band of the L system, and obtains the picture demodulation output in the UHF band of the L system if said first filter means receives the intermediate-frequency signal in the UHF band of the L system; and when the tuned frequency of said video tank circuit is switched to the frequency of the picture intermediate frequency component in the VHF low-band of the L system, said first intermediate-frequency processing circuit means obtains the picture demodulation output in the VHF low-band of the L system.

12. The processing circuit according to claim 11, wherein said video tank circuit is constituted by parallel-connecting a coil, a first capacitor, and a series circuit of a second capacitor and a switch.

13. The processing circuit according to claim 12, wherein, when said switch is turned on, said video tank circuit sets the tuned frequency to be the frequency of the picture intermediate frequency component of the B/G system, and when said switch is turned off, it sets the tuned frequency to be the frequency of the picture intermediate frequency component in the VHF low-band of the L system.

14. The processing circuit according to claim 10, wherein said second intermediate-frequency processing circuit means has a sound tank circuit which can switch a tuned frequency to a frequency ranging between the frequency of the sound intermediate frequency component in VHF high-band and the UHF band of the L system, and the frequency of the sound intermediate frequency component in the VHF low-band of the L system; when the tuned frequency of said sound tank circuit is switched to the frequency of the sound intermediate frequency component in the VHF high-band and the UHF band of the L system, said second intermediate-frequency processing circuit means obtains the sound demodulation output in the VHF high-band of the L system if said first filter means receives the intermediate-frequency signal in the VHF high-band of the L system, and obtains the sound demodulation output in the UHF band of the L system if said first filter means receives the intermediate-frequency signal in the UHF band of the L system; and when the tuned frequency of said sound tank circuit is switched to the frequency of the sound intermediate frequency component in the VHF low-band of the L system, said second intermediate-frequency processing circuit means obtains the sound demodulation output in the VHF low-band of the L system.

15. The processing circuit according to claim 14, wherein said sound tank circuit is constituted by parallel-connecting a coil, a first capacitor, and a series circuit of a second capacitor, and a switch.

16. The processing circuit according to claim 15, wherein, when said switch is turned on, said sound tank circuit sets the tuned frequency to be the frequency of the sound intermediate frequency component in the VHF high-band and the UHF band of the L system, and when said switch is turned off, it sets the tuned frequency to be the frequency of the sound intermediate frequency component in the VHF low-band of the L system.

17. The processing circuit according to claim 10, wherein each of said first and second filter means comprises a surface acoustic wave filter.

* * * * *